(12) United States Patent
Keoshkerian et al.

(10) Patent No.: US 8,991,992 B2
(45) Date of Patent: Mar. 31, 2015

(54) INKJET INK CONTAINING SUB 100 NM LATEXES

(71) Applicant: Xerox Corporation, Norwalk, CT (US)

(72) Inventors: Barkev Keoshkerian, Thornhill (CA); Daryl W. Vanbesien, Burlington (CA); Michelle N. Chretien, Mississauga (CA); Marcel P. Breton, Mississauga (CA); Jenny Eliyahu, Maple (CA)

(73) Assignee: Xerox Corporation, Norwalk, CT (US)

( * ) Notice: Subject to any disclaimer, the term of this patent is extended or adjusted under 35 U.S.C. 154(b) by 159 days.

(21) Appl. No.: 13/746,986

(22) Filed: Jan. 22, 2013

(65) Prior Publication Data

US 2014/0204162 A1 Jul. 24, 2014

(51) Int. Cl.
*B41J 2/01* (2006.01)
*C09D 11/30* (2014.01)
*B41J 2/005* (2006.01)
*B82Y 30/00* (2011.01)

(52) U.S. Cl.
CPC ............... *C09D 11/30* (2013.01); *B41J 2/0057* (2013.01); *B82Y 30/00* (2013.01); *Y10S 977/773* (2013.01); *B41J 2002/012* (2013.01)
USPC .......................................... 347/100; 977/773

(58) Field of Classification Search
USPC .................. 347/95, 100; 106/31.13
See application file for complete search history.

(56) References Cited

U.S. PATENT DOCUMENTS

| | | | |
|---|---|---|---|
| 5,389,958 A | 2/1995 | Bui et al. | |
| 6,593,049 B1 | 7/2003 | Veregin et al. | |
| 6,756,176 B2 | 6/2004 | Stegamat et al. | |
| 6,764,173 B2 * | 7/2004 | Chen et al. | 347/100 |
| 6,830,860 B2 | 12/2004 | Sacripante et al. | |
| 7,381,755 B2 * | 6/2008 | Wang et al. | 523/160 |
| 7,749,672 B2 | 7/2010 | Farrugia | |
| 7,754,406 B2 | 7/2010 | Vanbesien et al. | |
| 7,781,138 B2 | 8/2010 | Sacripante et al. | |
| 8,097,661 B2 | 1/2012 | Chopra et al. | |
| 8,123,347 B2 | 2/2012 | Odell et al. | |
| 8,158,693 B2 | 4/2012 | Breton et al. | |
| 8,231,213 B2 * | 7/2012 | Yanagi et al. | 347/100 |
| 8,262,210 B2 | 9/2012 | Chretien et al. | |
| 8,309,621 B2 | 11/2012 | Breton et al. | |
| 8,360,569 B2 * | 1/2013 | Chen et al. | 347/100 |
| 2002/0175983 A1 * | 11/2002 | Ishikawa et al. | 347/100 |
| 2003/0095170 A1 | 5/2003 | Johnson | |
| 2004/0061755 A1 * | 4/2004 | Chen et al. | 347/100 |
| 2004/0063807 A1 * | 4/2004 | Wang et al. | 523/160 |
| 2007/0077510 A1 | 4/2007 | Nosella et al. | |
| 2008/0220362 A1 | 9/2008 | Moore et al. | |
| 2011/0129774 A1 | 6/2011 | Farrugia et al. | |
| 2011/0177248 A1 | 7/2011 | Vanbesien et al. | |
| 2011/0177264 A1 | 7/2011 | Kawai | |
| 2012/0123040 A1 | 5/2012 | Keoshkerian et al. | |

(Continued)

*Primary Examiner* — Huan Tran
(74) *Attorney, Agent, or Firm* — Pillsbury Winthrop Shaw Pittman LLP

(57) ABSTRACT

An aqueous latex ink includes a polymer latex having a particle size of less than about 100 nm. A method of making an aqueous latex ink includes emulsifying a polymer without the use of a surfactant to prepare a latex having a particle size of less than 100 nm. A method of printing an image on a substrate includes applying an aqueous latex ink to an intermediate receiving member using an inkjet printhead, spreading the ink onto the intermediate receiving member, inducing a property change of the ink, and transferring the ink to a substrate, wherein the ink comprises a latex having a particle size of less than about 100 nm.

18 Claims, 3 Drawing Sheets

(56) References Cited

U.S. PATENT DOCUMENTS

| | | |
|---|---|---|
| 2012/0190765 A1 | 7/2012 | Chopra et al. |
| 2012/0236065 A1 | 9/2012 | Iftime et al. |
| 2012/0288790 A1 | 11/2012 | Sweeney et al. |
| 2012/0308925 A1 | 12/2012 | Vanbesien et al. |
| 2013/0202858 A1* | 8/2013 | Shimohara ................. 428/195.1 |
| 2013/0208045 A1* | 8/2013 | Shimohara et al. ............ 347/20 |

* cited by examiner

INKJET INK CONTAINING SUB 100 NM LATEXES

TECHNICAL FIELD

The present disclosure is generally related to indirect printing methods, and more specifically, to ink compositions for use in indirect printing methods.

BACKGROUND

Indirect printing methods generally include a two-step printing process including applying ink imagewise onto an intermediate receiving member, such as a drum or a belt, using an inkjet printhead, and then transferring a transient image to a substrate. After the ink is applied imagewise onto the intermediate receiving member, the ink wets or spreads on the intermediate receiving member to form a transient image. The transient image undergoes a change in properties, such as partial or complete drying, thermal or photo-curing or gelation, and is then transferred to the substrate.

Inks for use in an indirect printing method are designed and optimized to be compatible with the different subsystems, i.e., jetting and transferring. Specifically, an ink used in indirect printing must have properties, such as surface tension, viscosity, and particle size, suitable for use in a piezoelectric inkjet printhead. The ink must also be able to wet the intermediate receiving member to form the transient image and to undergo a stimulus induced property change to release from the intermediate receiving member in the transfer step.

Particularly, inks suitable for use in indirect printing must meet specific sub-system requirements that are unique to the inkjet/transfix printing architecture. Two important properties include wetting and release properties. Currently, no ink exists that enables both wetting and transfer that enables high quality printing at high speeds. Generally, inks that display good wettability do not transfer well onto a substrate and conversely, inks that efficiently transfer to the substrate do not adequately wet the intermediate receiving member.

Conventional aqueous latex inks contain water, one or more humectants, a colorant, and a polymer latex. A polymer latex is an aqueous dispersion of polymer particles having a size below 500 nm. When typical emulsion polymerization is used to produce a polymer latex, the particle size is largely determined by the surfactant concentration, the monomer choice, and the temperature. Latex properties such as stability, film-forming ability, covering capacity, and opacity are controlled by particle size and the amount of surfactant present. Generally, lower particle size improves the above properties, particularly film formation. However, one problem with conventional latexes is that to get a particle size below 100 nm requires large amounts of surfactants, which detrimentally affect latex properties.

SUMMARY

Provided is an aqueous latex ink comprising a polymer latex having a particle size of less than about 100 nm.

Also provided is a method of making an aqueous latex ink comprising emulsifying a polymer without the use of a surfactant to prepare a latex having a particle size of less than 100 nm.

Additionally provided is a method of printing an image on a substrate comprising applying an aqueous latex ink onto an intermediate receiving member using an inkjet printhead, spreading the ink onto the intermediate receiving member, inducing a property change of the ink, and transferring the ink to a substrate, wherein the ink comprises a latex having a particle size of less than about 100 nm.

EMBODIMENTS

An aqueous latex ink comprising a polymer latex having an average particle diameter D50 of less than about 100 nm, results in an aqueous latex ink having a number of advantages over inks that do not include a polymer latex having a particle size of less than about 100 nm. Using such an ink in a two-step printing process including applying the ink imagewise onto an intermediate receiving member and then transferring the ink from the intermediate receiving member to the substrate, results in an ink that displays both good wettability and transferability, while also enabling faster drying of the ink when it is jetted onto the blanket material, compared to those inks that do not include a polymer latex having a particle size of less than about 100 nm. Additionally, the polymer latex having an average particle diameter D50 of less than about 100 nm does not contain any surfactants, allowing the native properties of the polymer to control film formation and transferability of the ink in an indirect printing method.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

Indirect Printing

Figure 1:
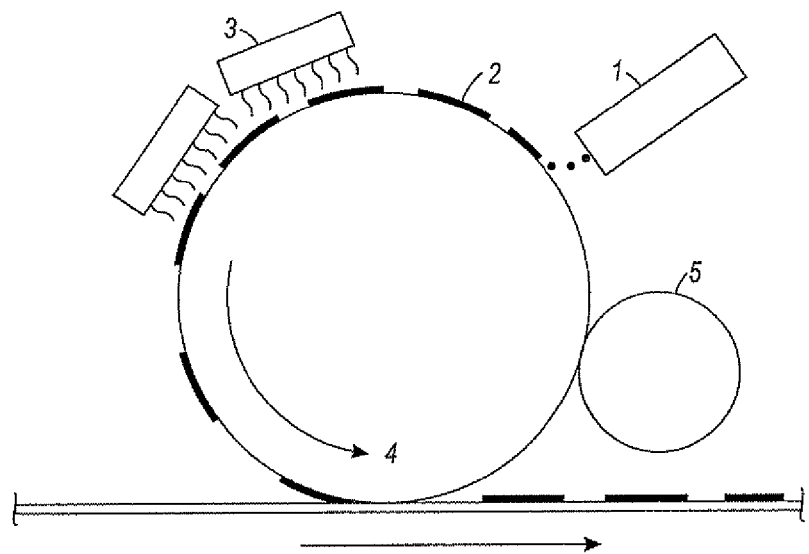
FIG. 1 is a schematic representation of a two-step printing process.

Images may be applied to a substrate using a two-step printing process. As shown in FIG. 1, the two step process includes applying an ink imagewise onto an intermediate receiving member, such as a drum or a belt, using an inkjet printhead 1, wetting/spreading the ink on the intermediate receiving member to form the transient image 2, inducing a property change, such as partial or complete drying, thermal or photo-curing, or gelation, in the transient image 3, and transferring an image to the substrate 4. An exemplary offset or indirect printing process is also disclosed in U.S. Pat. No. 5,389,958, the entire disclosure of which is incorporated herein by reference.

Ink Materials

Ink suitable for use in an indirect printing process, such as the two-step printing process described above, must have surface tension, viscosity, and particle size suitable for use in a piezoelectric inkjet printhead. Suitable values for the surface tension of jettable inks are typically from about 15 to about 50 dynes/cm, such as from about 15 to about 30 dynes/cm, from about 25 to about 40 dynes/cm, or from about 35 to about 50 dynes/cm. Suitable values for the viscosity of jettable inks are typically from about 2 to about 20 centipoise (cps) below 60° C., such as from about 2 to about 12 cps, from about 10 to about 16 cps, or from about 14 to about 20 cps. Suitable values for the particle size of jettable inks are less than about 200 nm, less than about 150 nm, less than about 100 nm, or from about 10 nm to about 200 nm.

Suitable inks include for use in an indirect printing process contain water, one or more humectants, a colorant, and a polymer latex. Conventionally, a polymer latex is an aqueous dispersion of polymer particles having a size of about 500 nm or less. When a typical emulsion polymerization is done, the particle size is largely determined by the surfactant concentration, the monomer choice, and the temperature. Latex properties such as stability, film-forming ability, covering capacity, and opacity are controlled by polymer structure, particle size, and the amount of surfactant present. Lower particle size improves the properties mentioned above, particularly film formation. However, to make conventional latexes smaller than about 100 nm requires a large amount of surfactant, which detrimentally affects the latex properties.

As disclosed herein, suitable inks contain a polymer latex having a size of less than about 100 nm. Additionally, the polymers contain hydrophilic functional groups, either randomly distributed or as blocks. Thus, the polymers have an affinity for water. If heated above their glass transition temperature in water, these polymers dissolve in water due to the presence of the hydrophilic functional groups and, upon cooling at a controlled rate, the polymer chains associate together by self-assembly to form nanometer-sized particles without the use of a surfactant. The presence of the hydrophilic functional groups, such as sulphonate, may control the surface tension or the interfacial tension and, thus, contributes to the determination of latex particle size.

Suitable humectants include polyols, polyalkylene glycols, glycol ethers, lactams, sulfur-containing compounds, 1,2-propanediol, 1,3-propanediol, 1,3-butanediol, 3-methyl-1,3-butanediol, 1,5-pentanediol, 1,6-hexanediol, 1,2,6-hexanetriol, glycerol, ethylene glycol, diethylene glycol, propylene glycol, butylene glycol, trimethylol propane, triethylene glycol, diethylene glycol methyl ether, triethylene glycol (mono) methyl ether, ethylene glycol diethyl ether, diethylene glycol ethyl ether, diethylene glycol diethyl ether, triethylene glycol ethyl ether, ethylene glycol isopropyl ether, ethylene glycol propyl ether, ethylene glycol butyl ether, diethylene glycol butyl ether, tripropylene glycol methyl ether, propylene glycol ethyl ether, propylene glycol butyl ether, dipropylene glycol dimethyl ether, polyethylene glycol, polyproylene glycol, copolymers of polyethylene glycol and polypropylene glycol, 2-pyrrolidone, 1-methyl-2-pyrrolidone, 1,5-dimethyl-2-pyrrolidone, 1-ethyl-2-pyrrolidone, 1-propyl-2-pyrrolidone, 1-isopropyl-2-pyrrolidone, 1-butyl-2-pyrrolidone, 1-(2-hydroxyethyl)-2-pyrrolidone, sulfolane, and mixtures thereof. The humectant may be present in an amount of from about 2 to about 20 wt %, such as from about 2 to about 9 wt %, from about 8 to about 13 wt %, or from about 12 to about 20 wt %, based on a total weight of the ink.

Preparation of Inks

An aqueous latex ink containing latex having a particle size of less than about 100 nm may be produced using any suitable method. For example, the ink may be produced by adding a surfactant and a carbon black dispersion to an appropriate reaction vessel to create a mixture. While the mixture is being stirred, water may be slowly added to the reaction vessel. Separately, the pH of the latex having a particle size of less than about 100 nm, such as less than about 75 nm, or less than about 50 nm, may be adjusted to a value of, for example, about 6.6, or about 6.8, or about 7.0, or about 7.2. The latex may then be slowly added to the vessel and chased with water. The mixture may then be homogenized to form an aqueous inkjet ink.

Particularly, preparing the ink containing latexes with a particle size of less than about 100 nm includes preparing a resin and/or copolymer, and preparing a latex from the resin and/or copolymer, without using a surfactant to produce the latex.

Preparing a Polyester Resin Latex

Suitable polyester resins include, for example, those which are sulfonated, non-sulfonated, crystalline, amorphous, and combinations thereof. The polyester resins may be linear, branched, crosslinked, and combinations thereof. Polyester resins may include those described, for example, in U.S. Pat. Nos. 6,593,049; 6,830,860; 7,754,406; 7,781,138; 7,749,672; and 6,756,176, the disclosures of each of which are hereby incorporated by reference in entirety.

A polyester resin may be obtained synthetically, for example, in an esterification reaction involving a reagent comprising a carboxylic acid group and another reagent comprising an alcohol. The alcohol reagent may include two or more hydroxyl groups, such as three or more hydroxyl groups, and the acid may include two or more carboxylic acid groups, such as three or more carboxylic acid groups. Reagents comprising three or more functional groups enable, promote or enable and promote polymer branching and crosslinking. A polymer backbone or a polymer branch may include at least one monomer unit comprising at least one pendant group or side group, that is, the monomer reactant from which the unit was obtained comprises at least three functional groups.

For example, preparing a polyester resin may include, for example, an esterification stage and a polycondensation stage. The esterification stage may include charging a mixture of a polyacid/polyester, a diacid and/or an anhydride, a humectant, a polyol, and a catalyst to a suitable reactor, such as a stainless steel reactor. The mixture may then be agitated at a rate of, for example about 80 RPM, about 90 RPM, or about 100 RPM, and heated to a temperature of, for example, about 180° C., about 190° C., or about 200° C. The mixture may be held at 180° C. for about 1 hour, about 2 hours, or about 5 hours, to remove the distillate. The distillate may be collected in a distillation receiving tank. To gradually remove the distillate, the reactor temperature may be gently stepped up from 180° C. to 210° C. and finally to 220° C., resulting in removal of all of the distillate from the esterification stage.

Suitable polyacids or polyesters that can be used for preparing an amorphous polyester resin include terephthalic acid, phthalic acid, isophthalic acid, fumaric acid, trimellitic acid, diethyl fumarate, dimethyl itaconate, cis-1,4-diacetoxy-2-butene, dimethyl fumarate, diethyl maleate, maleic acid, succinic acid, itaconic acid, succinic acid, cyclohexanoic acid, succinic anhydride, dodecylsuccinic acid, dodecylsuccinic anhydride, glutaric acid, glutaric anhydride, adipic acid, pimelic acid, suberic acid, azelaic acid, dodecanedioic acid, dimethyl naphthalenedicarboxylate, dimethyl terephthalate, diethyl terephthalate, dimethylisophthalate, diethylisophthalate, dimethylphthalate, phthalic anhydride, diethylphthalate, dimethylsuccinate, naphthalene dicarboxylic acid, dimer diacid, dimethylfumarate, dimethylmaleate, dimethylglutarate, dimethyladipate, dimethyl dodecylsuccinate, and combinations thereof. The organic polyacid or polyester reagent may be present, for example, in an amount from about 40 to about 60 mol % of the resin, such as from about 40 to about 48 mol % of the resin, from about 46 to about 54 mol %, or from about 52 to about 60 mol % of the resin, and optionally a second polyacid can be used in an amount from about 0.1 to about 10 mol % of the resin.

Suitable diacids include sodium sulfoisophthalic. Suitable anhydrides include maleic anhydride, trimellitic anhydride, n-dodecenylsuccinic anhydride, 2-dodecenylsuccinic anhydride, 2-undecenylsuccinic anhydride, and combinations thereof. The diacid and/or anhydride may be present in a combined amount of from about 0.90 to 1.1 mol equivalents, such as from about 0.9 to 0.98 mol equivalents, from about 0.95 to about 1.05 mol equivalents, or from about 1.02 to 1.1 mol equivalents, based on about 1 mol equivalent of the polyol. Moreover, the diacid and/or dihydrides may be present in a combined amount of from about 10 to about 60 wt %, such as from about 10 to about 25 wt %, from about 20 to about 40 wt %, or from about 30 to about 60 wt %, based on a total weight of the reactants.

Suitable polyols include 1,2-propanediol, 1,3-propanediol, 1,2-butanediol, 1,3-butanediol, 1,4-butanediol, pentylene glycol, hexylene glycol, diphenol, neopentyl glycol, diethylene glycol, dipropylene glycol, 2,2-bis-(4-hydroxyphenyl) propane, 2,2-bis-(3-hydroxyphenyl)propane, 2,2-bis-(2-hydroxyphenyl)propane, 2,2-bis-(3-hydroxyphenyl)propane, 2,2-bis-(5-hydroxyphenyl)propane, Bisphenol-A, ethoxylated Bisphenol-A, bis-(4-hydroxyphenyl)methane, 1,1-bis-(4-hydroxyphenyl)ethane, cis-1,4-dihydroxy-cyclohexane, trans-1,4-dihydroxy-cyclohexane, cis-1,2-dihydroxy-cyclohexane, trans-1,2-dihydroxy-cyclohexane, trans-1,3-dihydroxy-cyclohexane, cis-1,3-dihydroxy-cyclohexane, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene glycol, and combinations thereof. The amount of polyol may be present in an amount of, for example, from about 40 to about 60 mol % of the resin, from about 40 to about 48 mol % of the resin, from about 46 to about 54 mol % of the resin, or from about 52 to 60 mol % of the resin, and an optional second polyol may be used in an amount from about 0.1 to about 10 mol %, such as from about 1 to about 4 mol % of the resin.

Suitable catalysts include FASCAT-4100, a butyltin oxide catalyst available from Elf Atochem North America, Inc. and alkali carbonates, such as potassium carbonate, sodium carbonate, rubidium carbonate, cesium carbonate, beryllium carbonate, magnesium carbonate, calcium carbonate, strontium carbonate, manganese carbonate, barium carbonate, and combinations thereof. The catalysts may be present in an amount of from about 0.001 to about 0.1 mol equivalents, such as from about 0.001 to about 0.04 mol equivalents, from about 0.03 to about 0.07 mol equivalents, or from about 0.06 to about 0.1 mol equivalents, based on about 1 mol equivalent of the polyol.

In the polycondensation stage, excess glycol may be removed from the reaction mixture obtained in the esterification stage using any suitable means, such as by applying a vacuum. For example, the pressure may be slowly reduced from atmospheric pressure to about 8 mmHg, such as to about 7 mm Hg, or to about 6 mmHg, and then held at elevated temperatures, such as from about 150° C. to about 250° C., from about 150° C. to about 180° C., from about 170° C. to about 205° C., or from about 200° C. to about 250° C., to facilitate the removal of distillate. For example, the reaction mixture may be held at the elevated temperatures for about 2.5 hours, or about 3 hours, or about 3.5 hours. During this time, distillate may be collected in a distillation receiving tank. The reactor may then be purged with nitrogen to atmospheric pressure, and a hot, molten resin product may be discharged out of the reactor. The hot molten resin product may then be cooled using, for example, dry ice. The resulting product is a polyester resin.

Figure 2:
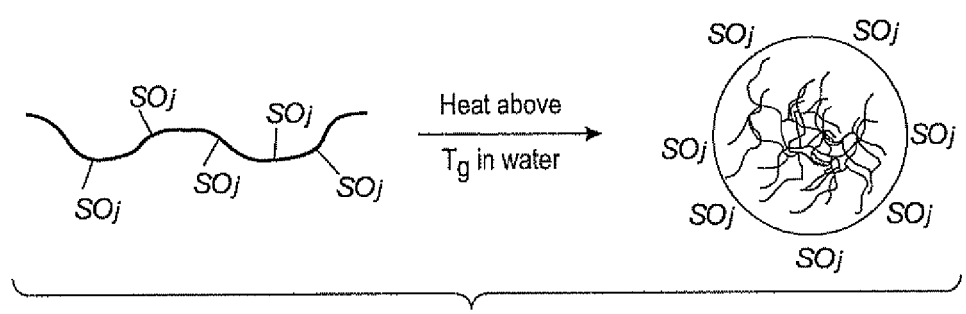
FIG. 2 is a schematic representation of the formation of a latex particle.

A latex may be then be formed from the polyester resin. For example, the polyester resin may be broken down into smaller particle sizes, such as by fritz milling, to obtain a powder consistency for emulsion preparation. An aqueous colloidal resin may be prepared by first heating deionized water to about 90° C., or about 94° C., or about 98° C., while stirring, and then adding the polyester resin thereto, to obtain a mixture. The mixture may be continuously stirred for about 3 hours, or about 4 hours, or about 5 hours, and then cooled and filtered to obtain the latex particles. The resulting latex particles have a particle size less than about 100 nm, such as less than about 75 nm, or less than about 50 nm. A schematic representation for forming a latex particle is shown in FIG. 2.

Preparing a Copolymer Latex

A stable free radical polymerization (SFRP) block copolymer may be prepared by adding a mixture of a hydrophilic monomer, an organic solvent, water, a stable free radical, and an initiator to a suitable reactor, such as a round bottom flask. The mixture may be deoxygenated and then heated to about 130° C. for about 6 hours, or about 6.5 hours, or about 7 hours. Then, a monomer or mixture of monomers may be added to the mixture, which is then reheated to about 115° C., or about 120° C., or about 130° C. for about 6 hours, or about 6.5 hours, or about 7 hours. The resulting solution may then be added to a non-solvent for the polymer, resulting in a block copolymer.

Suitable hydrophilic monomers include styrene sulfonate, acrylates, methacrylates, and amino acrylates. The hydrophilic monomers may be added in an amount of from about 1 to about 25 mol %, such as from about 1 to about 5 mol %, from about 3 to about 10 mol %, or from about 9 to about 20 mol %, based upon the total moles of the hydrophobic monomer.

Suitable organic solvents include polyhydric alcohols such as ethylene glycol, diethylene glycol, polyethylene glycol, glycerin; N-alkyl pyrrolidones; esters such as ethyl acetate, amyl acetate; and glycol ethers such as ethylene oxide or propylene oxide adducts of methanol, butanol, and phenol. These organic solvents may be used singly or in combination of two or more kinds thereof. The organic solvents may be added in an amount capable of dissolving the hydrophilic monomers and enabling the organic solvent/water ratio to achieve heating temperatures of at least about 130° C., such as at least about 135° C., or at least about 140° C.

Suitable solvents include deionized water dissolve the hydrophilic monomers and enable the organic solvent/water ratio to achieve heating temperatures of at least about 130° C., such as at least about 135° C., or at least about 140° C.

Suitable stable free radicals include TEMPO (2,2,6,6-tetramethyl-piperidine-1-oxyl); nitroxide free radicals such as proxyl(2,2,5,5-tetramethyl-1-pyrrolidinyloxy), 3-carboxyl-proxyl, 3-carbamoyl-proxyl, 2,2-dimethyl-4,5-cyclohexyl-proxyl, 3-oxo-proxyl, 3-hydroxylimine-proxyl, 3-aminomethyl-proxyl, 3-methoxy-proxyl, 3-t-butyl-proxyl, 3-maleimidoproxyl, 3,4-di-t-butyl-proxyl, 3-carboxylic-2,2,5,5-tetramethyl-1-pyrrolidinyloxy, and derivatives thereof; TEMPO (2,2,6,6-tetramethyl-1-piperidinyloxy), 4-benzoxy-loxy-TEMPO, 4-methoxy-TEMPO, 4-carboxylic-4-amino-TEMPO, 4-chloro-TEMPO, 4-hydroxylimine-TEMPO, 4-hydroxy-TEMPO, 4-oxo-TEMPO, 4-oxo-TEMPO-ethylene ketal, 4-amino-TEMPO, 2,2,6,6-tetraethyl-1-piperidinyloxy, 2,2,6-trimethyl-6-ethyl-1-piperidinyloxy, and derivatives thereof; diallyl nitroxide radicals such as di-t-butyl nitroxide, diphenyl nitroxide, t-butyl-t-amyl nitroxide, and derivatives thereof; DOXYL (4,4-dimethyl-1-oxazolidinyloxy), 2-di-t-butyl-doxyl, 5-decane-doxyl, 2-cyclohexane-doxyl, and derivatives thereof; 2,5-dimethyl-3,4-dicarboxylic-pyrrole, 2,5-dimethyl-3,4-diethylester-pyrrole, 2,3,4,5-tetraphenyl-pyrrole; 3-cyano-pyrroline-3-carbamoyl-pyrroline, and 3-carboxylic-pyrroline; 1,1,3,3-tetramethylisoindolin-2-yloxyl and 1,1,3,3-tetraethylisoindolin-2-yloxyl; porphyrexide nitroxyl radicals, such as 5-cyclohexyl porphyrexide nitroxyl, and 2,2,4,5,5-pentamethyl-D3-imidazoline-3-oxide-1-oxyl; galvinoxyl; 1,3,3-trimethyl-2-azabicyclo[2,2,2]octane-5-one-2-oxide; and 1-azabicyclo[3,3,1]nonane-2-oxide. The stable free radicals may be added in an amount of from about 0.001 to about 1 mol %, such as from about 0.001 to about 0.4 mol %, from about 0.3 to about 0.7 mol %, or from about 0.6 to about 1 mol %, based on a total number of moles of the monomer.

Any suitable initiator or mixture of initiators may be used. Suitable initiators include persulfates, such as ammonium persulfate and potassium persulfate, peroxides, such as hydrogen peroxide, acetyl peroxide, cumyl peroxide, tert-butyl peroxide, propionyl peroxide, benzoyl peroxide, chlorobenzoyl peroxide, dichlorobenzoyl peroxide, bromomethylbenzoyl peroxide, lauroyl peroxide, tetralin hydroperoxide, 1-phenyl-2-methylpropyl-1-hydroperoxide and tert-butylhydroperoxide pertriphenylacetate, diisopropyl peroxycarbonate, tert-butyl performate, tert-butyl peracetate, tert-butyl perbenzoate, tert-butyl perphenylacetate, tert-butyl permethoxyacetate, tert-butyl per-N-(3-toluoyl)carbamate, sodium persulfate, potassium persulfate, azo compounds, such as 2,2'-azobispropane, 2,2'-dichloro-2,2'-azobispropane, 1,1'-azo(methylethyl)diacetate, 2,2'-azobis(2-amidinopropane)hydrochloride, 2,2'-azobis(2-amidinopropane)-nitrate, 2,2'-azobisisobutane, 2,2'-azobisisobutylamide, 2,2'-azobisisobutyronitrile, methyl 2,2'-azobis-2-methylpropionate, 2,2'-dichloro-2,2'-azobisbutane, 2,2'-azobis-2-methylbutyronitrile, dimethyl 2,2'-azobisisobutyrate, 1,1'-azobis(sodium 1-methylbutyronitrile-3-sulfonate), 2-(4-methylphenylazo)-2-methylmalono-dinitrile, 4,4'-azobis-4-cyanovaleric acid, 3,5-dihydroxymethylphenylazo-2-methylmalonodinitrile, 2-(4-bromophenylazo)-2-allylmalonodinitrile, 2,2'-azobis-2-methylvaleronitrile, dimethyl 4,4'-azobis-4-cyanovalerate, 2,2'-azobis-2,4-dimethylvaleronitrile, 1,1'-azobiscyclohexanenitrile, 2,2'-azobis-2-propylbutyronitrile, 1,1'-azobis-1-chlorophenylethane, 1,1'-azobis-1-cyclohexanecarbonitrile, 1,1'-azobis-1-cycloheptanenitile, 1,1'-azobis-1-phenylethane, 1,1'-azobiscumene, ethyl 4-nitrophenylazobenzylcyanoacetate, phenylazodiphenylmethane, phenylazotriphenylmethane, 4-nitrophenylazotriphenylmethane, 1'-azobis-1,2-diphenylethane, poly(bisphenol A-4,4'-azobis-4-cyanopentano-ate, and poly(tetraethylene glycol-2,2'-azobisisobutyrate); 1,4-bis(pentaethylene)-2-tetrazene, and 1,4-dimethoxycarbonyl-1,4-dipheny-1-2-tetrazene; and mixtures thereof. The initiator may be added in an amount of from, for example, about 0.1 to about 5 wt %, from about 0.4 to about 4 wt %, or from about 0.5 to about 3 wt % based on the total weight of the monomers to be polymerized.

Suitable monomers include a styrene, an acrylate, such as an alkyl acrylate, such as methyl acrylate, ethyl acrylate, butyl arylate, isobutyl acrylate, dodecyl acrylate, n-octyl acrylate, n-butylacrylate and 2-chloroethyl acrylate; β-carboxy ethyl acrylate (.beta.-CEA), phenyl acrylate, methyl α-chloroacrylate, methyl methacrylate, ethyl methacrylate, butyl methacrylate, butadiene, isoprene, methacrylonitrile, acrylonitrile, vinyl ethers, such as vinyl methyl ether, vinyl isobutyl ether, and vinyl ethyl ether; vinyl esters, such as vinyl acetate, vinyl propionate, vinyl benzoate and vinyl butyrate; vinyl ketones, such as vinyl methyl ketone, vinyl hexyl ketone, and methyl isopropenyl ketone; vinylidene halides, such as vinylidene chloride and vinylidene chlorofluoride; N-vinyl indole, N-vinyl pyrrolidone, methacrylate, acrylic acid, methacrylic acid, acrylamide, methacrylamide, vinylpyridine, vinylpyrrolidone, vinyl-N-methylpyridinium chloride, vinyl naphthalene, p-chlorostyrene, vinyl chloride, vinyl bromide, vinyl fluoride, ethylene, propylene, butylene, isobutylene, and mixtures thereof. A mixture of monomers can be a copolymer, such as a block copolymer, an alternating copolymer, a graft copolymer and so on. The monomers may be added in an amount of from about 75 to about 99 mol %, such as from about 75 to about 84 mol %, from about 80 to about 95 mol %, from about 90 to about 97 mol %, or from about 92 to about 99 mol %.

Suitable non-solvents for the polymer include acetone, lower alcohols such as methanol and ethanol, and aliphatic solvents such as hexane. The non-solvents may be added in an amount of from about 10 to about 90 wt %, such as from about 10 to about 40 wt %, from about 30 to about 70 wt %, or from about 60 to about 90 wt %, based on a total weight of the reactants.

The above SFRP block copolymer may be added to a reaction vessel, such as a beaker, containing water. The mixture of block copolymer and water may then be heated to about 80° C., such as about 85° C. or 90° C., and held at that temperature for about 3 hours, such as about 3.5 hours, or about 4 hours, resulting in a block copolymer latex. The resulting latex particles have a particle size less than about 100 nm, such as less than about 75 nm, or less than about 50 nm.

EXAMPLES

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 30° C.

Preparation of Sulfonated Polyester Resin 185.8 kg of dimethyl terephthalate, 23.1 kg of sodium sulfoisophthalic, 147.1 kg of propylene glycol, 64.8 kg of dipropylene glycol, and 0.48 kg of FASCAT-4100 (butyltin oxide catalyst from Elf Atochem North America, Inc.) were charged in a 150 gallon stainless steel reactor. The mixture was agitated at 80 RPM using two P2 45° angle blades. The reactor was then heated to 180° C., where it was held to remove the distillate. Approximately 12 kg of distillate was collected in approximately 1 hour. To achieve a gradual removal of the distillate, the reactor temperature was gently stepped up from 180° C. to 210° C. and finally to 220° C. so that all of the distillate from the esterification stage is removed. A total of 60.4 kg of distillate was collected in 5 hours.

In the subsequent polycondensation stage, a vacuum was applied to remove excess glycol from the reaction. The pressure was slowly reduced from atmospheric to about 8 mm Hg over a 3.5 hour period. The vacuum was held at these elevated temperatures for an additional 2.5 hours. A total of 112.6 kg of distillate was collected in a distillation receiving tank. The reactor was then purged with nitrogen to atmospheric pressure, and the hot molten polyester product was discharged through the bottom drain onto a container cooled with dry ice to yield 245.8 kg of a 3.77 mol % sulfonated polyester resin, sodium salt of (1,2-propylene-dipropylene-5-sulfoisophthalate)-copoly(1,2-propylene-dipropylene terephthalate).

The sulfonated polyester resin glass transition temperature was measured to be 57.7° C. (onset) using a 910 Differential Scanning Calorimeter operating at a heating rate of 10° C. per minute.

Preparation of Sulfonated Polyester Resin Latex

The polyester resin was then fritz milled into smaller particle sizes for emulsion preparation. A 24% aqueous colloidal sulfonate polyester resin was prepared by first heating 542 g of deionized water to 90° C. with stirring, and then adding thereto 174 g of the sulfonated polyester resin obtained above. The temperature and stirring of the mixture was continued for a duration of 3 hours. Then the mixture was cooled and filtered through a 20 micron stainless steel screen (#625 mesh). A sample is taken and measured by the Microtrac particle sizer to have a D50 of approximately 27 nm. FIG. 2 shows a schematic representation of the formation of a latex particle.

Preparation of Amphiphilic Block Copolymer

To a round bottom flask was added 167 g of styrene sulfonate, 535 mL of ethylene glycol, 150 g of water, 23.08 g of TEMPO (2,2,6,6-tetramethyl-piperidine-1-oxyl), and 22.29 g of ammonium persulfate/sodium bisulfite. This was deoxygenated for 10 minutes and then heated to 130° C. for 6 hours. To this solution was then added 390 mL of styrene and 110 mL of butylacrylate. The solution was then reheated to about 115° C. for 6 hours. The resulting solution was added to 4 L of acetone giving 259 g of poly(styrenesulfonate-b-styrene/butylacrylate).

Preparation of an Amphiphilic Block Copolymer Latex

Figure 3:
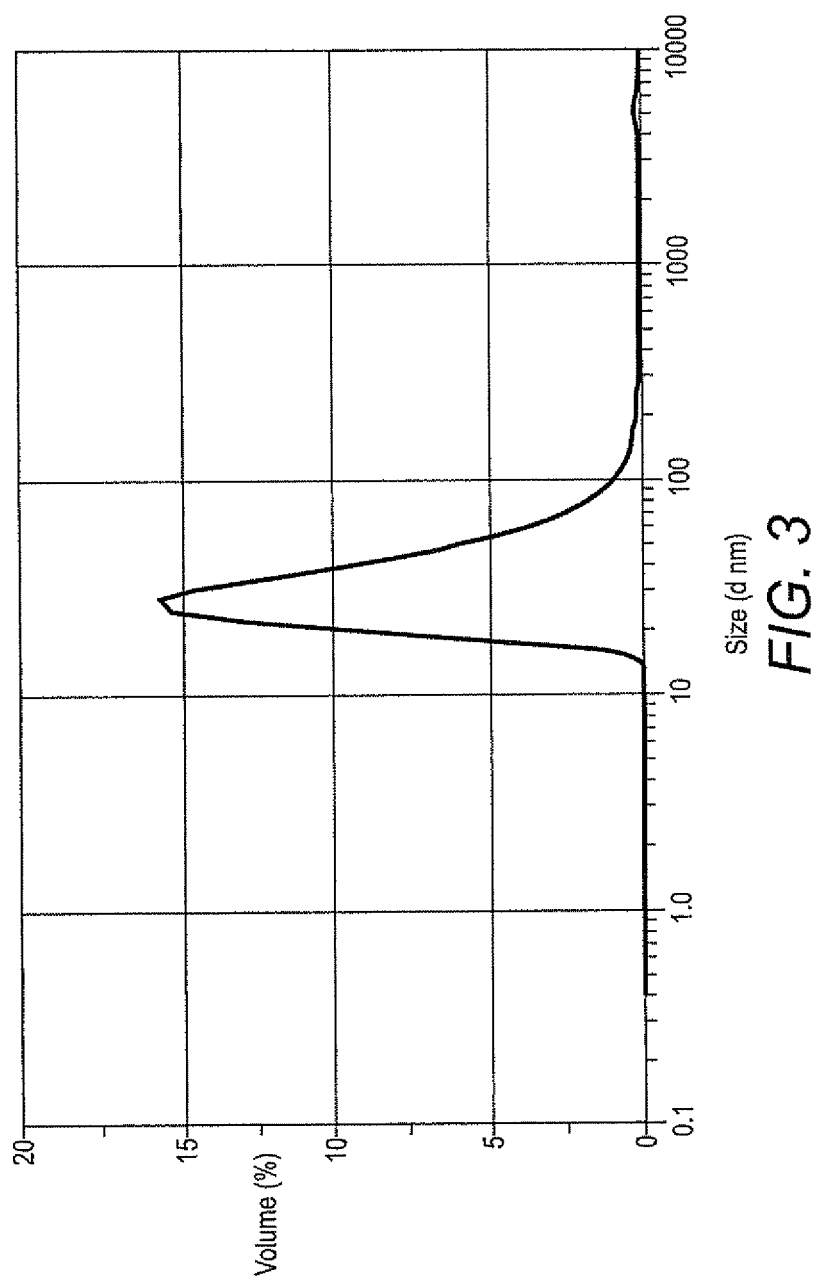
FIG. 3 is a graphical representation showing the particle size of the latex of the Example.
Figure 4:
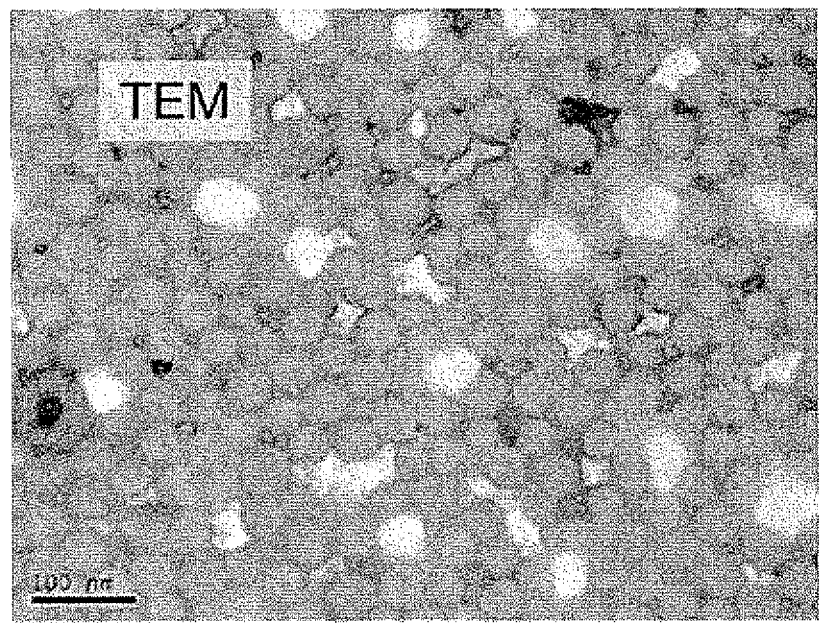
FIG. 4 is a transmission electron microscope (TEM) image showing the particle size of the amphiphilic block copolymer latex of the Example.

To a beaker was added 866 g of water, and then to this was add 134 g of the above amphiphilic block copolymer. This was then heated to 80° C. and maintained for 3 hours. The result was a latex of about 37.5 nm particles. FIGS. 3 and 4 show both a particle size and TEM image, respectively, indicating the latex size.

Ink Formulation Example

A surfactant and a carbon black dispersion are added to a 50 mL amber glass vial. While the mixture is stirred with a magnetic stir bar at 200 RPM, water (~20% to wash latex beaker) is slowly added. The pH of the latex is separately adjusted to 6.8 and then slowly added to the vial, which is chased with 20% water to clean latex residuals. The ink is then homogenized for 5 minutes at 2000 RPM. The composition of Ink A is shown in Table 1.

TABLE 1

Ink A Composition Ink A

| Component | Desired solids in ink (wt %) | Solids as supplied | Wt % of formulation | Actual weight (gm) |
| --- | --- | --- | --- | --- |
| Sulfonated polyester | 10.00% | 41.06% | 24.35% | 12.177 |
| Sulfolane (5% water) | 15.84% | 95.00% | 16.67% | 8.337 |
| 2-pyrrolidinone | 3.33% | 100.00% | 3.33% | 1.665 |
| PEO (Mw 20K) | 0.72% | 100.00% | 0.72% | 0.360 |
| Carbon Black 300 | 3.30% | 14.87% | 22.19% | 11.096 |

TABLE 1-continued

Ink A Composition Ink A

| Component | Desired solids in ink (wt %) | Solids as supplied | Wt % of formulation | Actual weight (gm) |
| --- | --- | --- | --- | --- |
| Dowicil 75 | 0.10% | 100% | 0.10% | 0.050 |
| FS8050 surfactant | 0.161% | 100% | 0.161% | 0.081 |
| Water | 52.03% | 100.00% | 32.47% | 16.234 |
| TOTAL | | | 100.0% | 50.000 |

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. An aqueous latex ink comprising a polymer latex having a particle size of less than about 100 nm, wherein no surfactants are used to produce the polymer latex.

2. The aqueous latex ink of claim 1, wherein a viscosity of the ink is from about 3 to about 20 cps.

3. The aqueous latex ink of claim 1, wherein a surface tension of the ink is from about 15 to about 50 dynes/cm.

4. The aqueous latex ink of claim 1, wherein the particle size of the polymer latex is less than about 50 nm.

5. The aqueous latex ink of claim 1, wherein the polymer latex contains a hydrophilic functional group.

6. The aqueous ink of claim 5, wherein the hydrophilic functionality is distributed randomly or as blocks in the polymer.

7. The aqueous ink of claim 1, further comprising at least one humectant.

8. A method of producing aqueous latex ink comprising emulsifying a polymer without the use of a surfactant to prepare a latex having a particle size of less than 100 nm.

9. The method of claim 8, further comprising heating the polymer above a glass transition point of the polymer in water.

10. The method of claim 8 further comprising:
adding a surfactant and a dispersion of carbon black to a reactor;
adding the latex having a particle size less than about 100 nm to the reactor; and
homogenizing the ink.

11. The method of claim 10, further comprising adjusting a pH of the latex before adding the latex to the reactor.

12. The method of claim 8, further comprising controlling a surface tension of the ink by adding surfactant to the ink.

13. The method of claim 12, wherein the pH of the latex is adjusted from about 6.6 to about 7.2.

14. A method of printing an image on a substrate comprising:
applying an aqueous inkjet ink to an intermediate receiving member using an inkjet printhead;
spreading the ink onto the intermediate receiving member;
inducing a property change of the ink; and
transferring the ink to a substrate,
wherein:
the ink comprises a latex having a particle size of less than about 100 nm, wherein the ink is produced by emulsifying a polymer without the use of a surfactant to prepare a latex having a particle size of less than 100 nm and heating the polymer above a glass transition point of the polymer in water.

15. The method of claim 14, wherein the particle size of the latex is less than about 50 nm.

16. The method of claim 14, wherein no surfactants are used to produce the polymer latex.

17. The method of claim 14, further comprising controlling a surface tension of the ink by adding surfactant to the ink.

18. The method of claim 14, wherein the latex contains a hydrophilic functional group.

* * * * *